United States Patent
Balder et al.

[11] Patent Number: 5,916,334
[45] Date of Patent: Jun. 29, 1999

[54] BOTTOM GUARD MECHANISM FOR AN AUTOMATED MACHINE

[75] Inventors: Richard E. Balder, Brainerd; Carl J. Taute, Merrifield, both of Minn.

[73] Assignee: Riverwood International Corporation

[21] Appl. No.: 08/867,204

[22] Filed: Jun. 2, 1997

[51] Int. Cl.⁶ ........................................... F16D 1/02
[52] U.S. Cl. ............... 74/612; 74/608; 29/DIG. 79; 29/DIG. 94; 29/DIG. 101; 16/382; 16/247
[58] Field of Search .................. 74/612, 613, 616, 74/608, 609; 16/382, 247; 49/394; 108/136, 144.11; 312/30, 21, 22, 26; 82/901; 409/137; 29/DIG. 56, DIG. 94, DIG. 101, DIG. 102, DIG. 61, DIG. 79

[56] References Cited

U.S. PATENT DOCUMENTS

| | | | |
|---|---|---|---|
| 1,177,023 | 3/1916 | Davis | 29/DIG. 94 X |
| 1,213,848 | 1/1917 | Edgington | 74/608 X |
| 2,443,734 | 6/1948 | Kearney et al. | 74/612 X |
| 3,805,639 | 4/1974 | Peter | 74/616 |
| 3,834,340 | 9/1974 | Thorpe . | |
| 3,993,376 | 11/1976 | Meldahl . | |
| 4,054,064 | 10/1977 | Walker | 74/612 |
| 4,304,027 | 12/1981 | DiFazio | 16/382 X |
| 5,113,558 | 5/1992 | Soroka et al. | 409/137 X |

FOREIGN PATENT DOCUMENTS

| 1566726 | 5/1980 | United Kingdom | 74/613 |
|---|---|---|---|

*Primary Examiner*—John A. Jeffery
*Assistant Examiner*—Mary Ann Battista
*Attorney, Agent, or Firm*—Skinner and Associates; Steve McLary

[57] ABSTRACT

A bottom guard for a machine having a plate with a hinged side pivotably attached to a first frame member of a machine and a catch side opposite the hinged side releasably held near a second frame member by a latching device. The plate holds debris from the operation of the machine and serves as a safety guard. The latching device has a first portion attached to the second frame member and a second portion attached to the catch side of the plate. The two portions of the latching device mechanically interlock and a solenoid actuated mechanism releases them upon a remote signal to the solenoid which allows the catch side of the plate to move by gravity, thereby opening the guard and discharging accumulated debris to a side of the machine. At least one shock absorbing device, such as an elastomeric shock cord, a pneumatic cylinder, or a hydraulic cylinder limits the amount that the plate will swing open when the catch is released and cushions the plate as it falls open.

17 Claims, 5 Drawing Sheets

BOTTOM GUARD MECHANISM FOR AN AUTOMATED MACHINE

BACKGROUND OF THE INVENTION

1. Field of the Invention

The present invention relates, generally, to safety and debris containment devices for machinery. More particularly, the invention relates to mechanical guards on industrial process equipment. The invention has particular utility in guards on the bottom of stationary automated machinery for cartoning articles.

2. Background Information

The state of the art includes various devices and methods for keeping personnel out of machinery while it is operating to prevent them from being injured. One common device is a mechanical guard that closes off a dangerous portion of the machine while it is operating. Since people must be able to access the machinery behind the guard for such things as maintenance, setup, and adjustment, the guards are typically completely removable or hinged so they can be swung open for access to the machine.

Packaging machines and other stationary process machines typically cover a large area of floor space. To keep people out from under these machines, skirting is often used which extends between the machine's legs from the frame of the machine to the floor. Skirting may be solid or mesh and may be attached to the frame and/or legs of the machine or may be free standing. The machines are usually raised some height above the floor to put the operating portions where people interface with the machine at an optimum height for people. This optimum height is different for different machines. For the same machine this optimum height may be different for different purchasers. Therefore, a different height skirting may be required depending on a purchaser's requirements. If the height of the machine above the floor needs to change significantly for some reason, new size skirting is required. To eliminate the variable size skirting, guards can be attached to the underside of the machine. However, gravity makes it more difficult to remove and attach such guards.

On process machinery, debris often falls through the machine to the floor where it must be removed. For machines which are close to the floor, it may be difficult for people to reach and remove fallen debris. For machines raised from the floor with skirting, the process of cleaning debris is somewhat easier, but skirts must be removed and set somewhere, and people must still reach under the machine to remove the debris. For machines with guards on the underside of the machine, a guard laden with debris can be very heavy and even dangerous to remove. As the guard is removed, debris can fall off and be scattered onto the floor, making clean up an even bigger job.

On packaging machines, the debris can include articles to be packaged, such as full cans or bottles, and packaging material. Because this debris can be quite heavy and bulky, in the past, packaging machines have typically used skirting as guards around the base of the machine and debris is allowed to fall to the floor where it is periodically swept out from under the machine. If a bottle or can containing liquid bursts as it hits the floor, the liquid covers a portion of the floor and fallen debris making clean up more troublesome.

Applicant's invention provides a guard which overcomes the limitations and shortcomings of the prior art. It is an object of the present invention to provide a guard that permits safer and easier removal of debris caused by operation of the machine. It is another object of the present invention to permit dumping of debris to the side of the machine onto the floor or into a receptacle when the guard opens. It is yet another object of the present invention to provide a safety feature of preventing access to working machinery from below the machine while the machine is operating. It is yet another object of the present invention to provide a guard which can be used on a machine regardless of the height of the machine above the floor. It is another object of the present invention to provide a guard which eliminates the need for safety skirting around the base of a machine.

BRIEF SUMMARY OF THE INVENTION

The present invention provides a guard for the underside of a machine which (i) prevents access to working machinery from below the machine while the machine is operating, (ii) holds debris accumulated from the operation of the machine, (iii) opens via a remote signal, and (iv) dumps the accumulated debris to the side of the machine. A guard of the present invention comprises a horizontally oriented plate with a hinged side pivotably attached to a first frame member of the machine and a catch side opposite the hinged side releasably held near a second frame member by a latching device. The latching device has a first portion attached to the second frame member and a second portion attached to the catch side of the plate. In the preferred embodiment the two portions of the latching device mechanically interlock and a solenoid actuated mechanism releases them upon reception of a remote signal to the solenoid which allows the catch side of the plate to drop, thereby opening the guard and discharging accumulated debris to a side of the machine. A shock absorbing device limits the distance that the plate will swing open when the catch is released and cushions the plate as it falls open. In the preferred embodiment, the shock absorbing device is an elastomeric shock cord attached between a frame member and the catch side of the plate. Alternative embodiments for the shock absorbing device include pneumatic cylinders and hydraulic cylinders.

Debris from operation of the machine accumulates on the guard and is dumped to the side of the machine when the catch is released thereby providing safer and easier removal of debris than if debris were allowed to accumulate on the floor under the machine. In the preferred embodiment, the catch side of the plate is manually lifted to engage the catch. If pneumatic or hydraulic cylinders are used for the shock absorbing device, they could also be used to lift the plate closed. A typical machine could have several guard assemblies on it and all of the catch assemblies could be electrically connected to allow simultaneously opening thereof. A portion of the catches can be electrically connected to a controller of the machine to provide a safety interlock which prevents the machine from operating when any of the guards are open.

Similar or the same guards can be used on a machine regardless of the height of the machine above the floor. Guards of the present invention eliminate the need for safety skirting around the base of a machine, and therefore eliminate the cost of changing skirt height due to change in machine height above the floor.

The features, benefits and objects of this invention will become clear to those skilled in the art by reference to the following description, claims and drawings.

DETAILED DESCRIPTION

Figure 1:
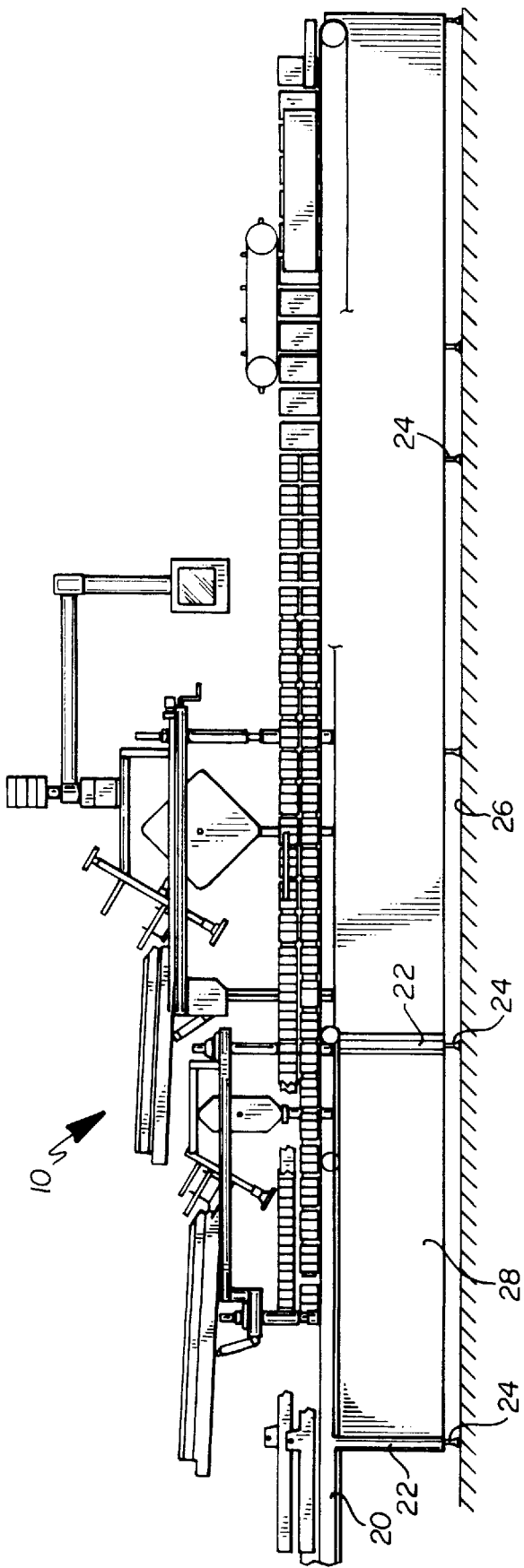
FIG. 1 is a side view of a packaging machine for which the present invention is applicable.

Referring to FIG. 1, a machine suited for guard doors of the present invention is a packaging machine 10 for cartoning beverage cans. However, the present invention is suited for many other processing machines. Such a machine is stationary, covers a large amount of floor space, and can have heavy and/or bulky debris from its operation fall under the machine. Machine 10 has a frame 20 typically made of structural steel rectangular tubing welded together. Legs 22 with adjustable feet 24 are attached to and support frame 20 at several locations along machine 10. Legs 22 and feet 24 are set to position frame 20 so that machine 10 is at an optimum height above floor 26 for people operating the machine. Such positioning leaves significant space between frame 20 and floor 26. Skirting 28 is often used on such a machine to keep people from getting into the workings of the machine from underneath while the machine is operating. Skirting 28 is usually made in sections which fit between legs 22. Sections of skirting 28 may be free standing or may be removably attached to frame 20 and/or legs 22. Sections of skirting may also have lock-out devices and/or sensors which prevent the skirting 28 from being removed while machine 10 is operating or which shut down the machine if a section of skirting is opened. Personnel must be able to access the machine from underneath for maintenance or to remove materials which may be caught in the machine, so skirting 28, or any guard, must readily open to allow access to the machine. Debris which falls to the floor from operation of the machine must also periodically be removed from under the machine, which also requires removing portions of skirting 28.

If the height of the machine 10 needs to be changed significantly, the height of skirting 28 would also have to be changed. Because different customers may have different height requirements for the machine they purchase, the manufacturer may have to make skirting unique for each machine. Changing skirt height can be costly to both the user and manufacturer of such machines. The guard of the present invention eliminates the skirting 28 on machine 10 while still preventing unauthorized access to the workings of the machine from below.

Figure 2:
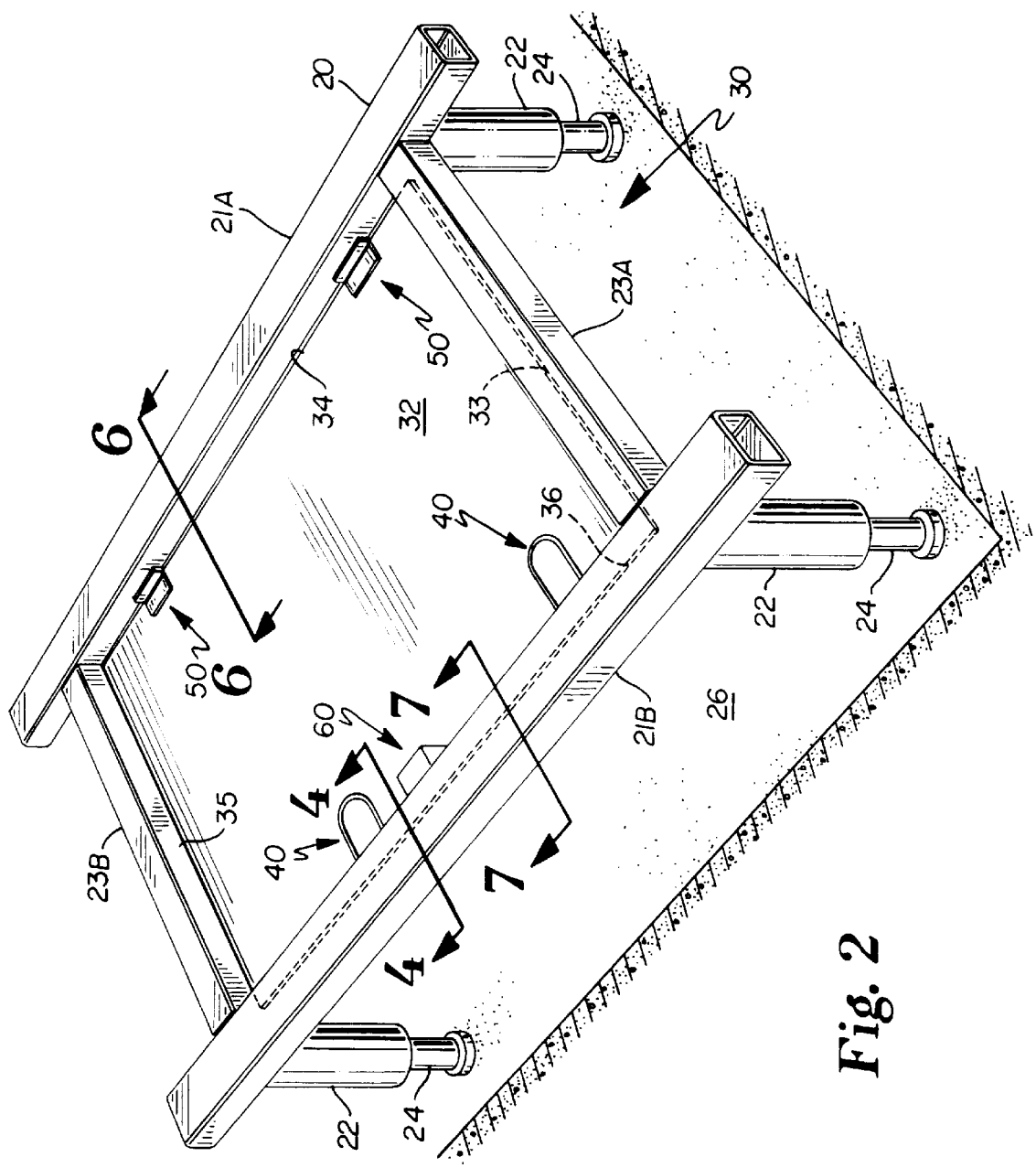
FIG. 2 is a perspective view of a portion of a machine frame with a guard door of the present invention closed.

Referring to FIG. 2, a portion of a machine frame 20 with legs 22 and feet 24 is shown with guard assembly 30 closed. Frame 20 typically has at least two parallel longitudinal members 21A and 21B, and several transverse members 23 between and connected to longitudinal members 21A and 21B. Any two adjacent transverse members 23A and 23B and longitudinal members 21A and 21B form a rectangular opening which can be closed by a guard assembly 30. Such a frame 20 could, therefore, have several guard assemblies 30 along it.

Guard assembly 30 is comprised of a plate 32, at least one shock absorbing assembly 40, at least one hinge assembly 50, and a catch assembly 60. When guard assembly 30 is closed it covers a bottom opening in frame 20. Plate 32 is held in a closed position generally aligned with bottoms of frame members 21A, 21B, 23A and 23B. A first side 34 of plate 32 is held by hinge assemblies 50 attached to frame member 21A and first side 34 of plate 32. A second side 36 of plate 32, opposite side 34, is held by a releasable catch assembly 60 having a portion attached to frame member 21B and another portion attached to plate 32 near side 36. Ends 33 and 35 of plate 32 are adjacent frame members 23A and 23B respectively. Any debris falling from the machine during operation is held on plate 32 until guard assembly 30 is opened.

Figure 3:
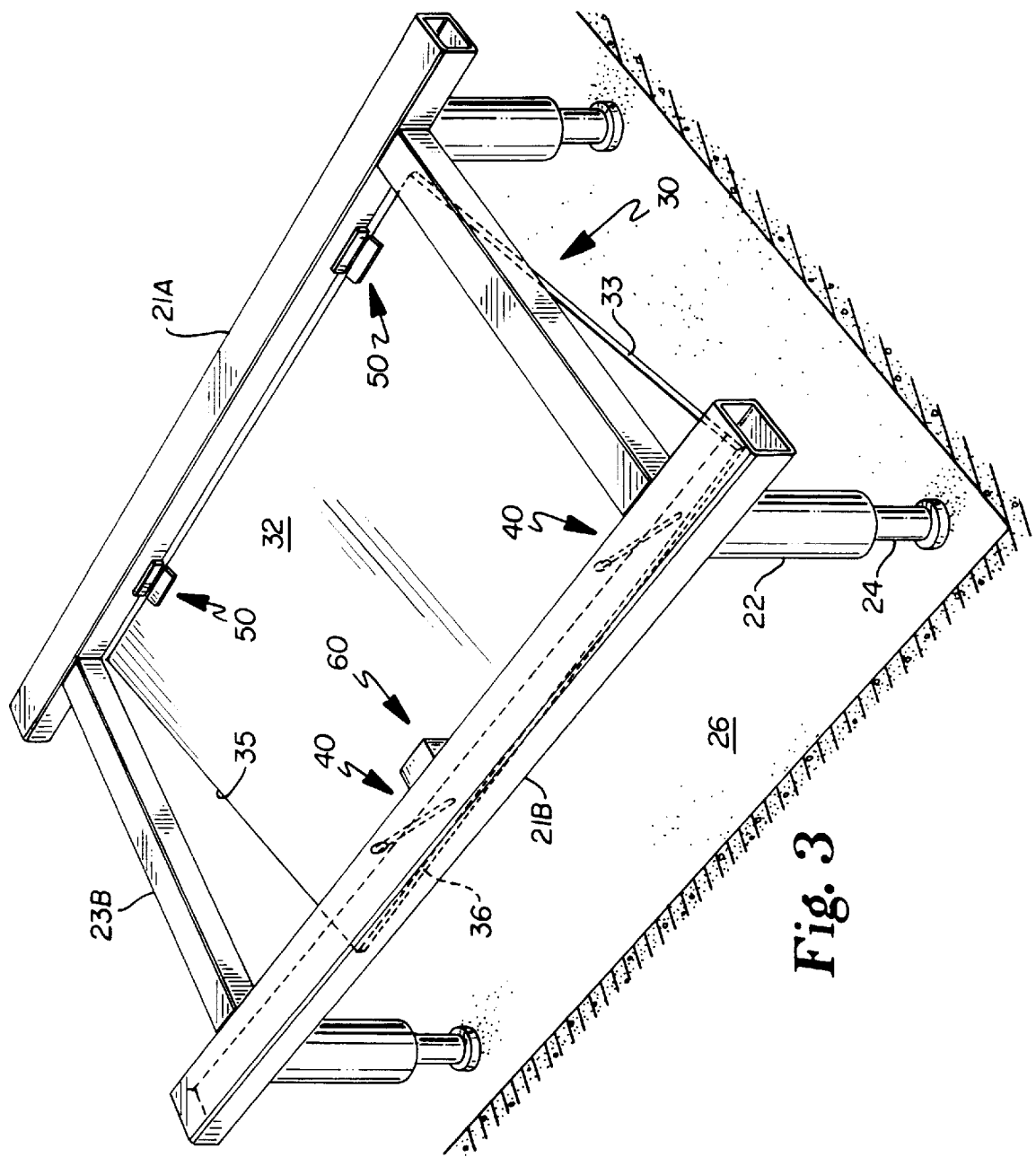
FIG. 3 is a perspective view of FIG. 2 with the guard door open.

Referring to FIGS. 2 and 3, when catch assembly 60 is released, plate 32 swings downwardly open, pivoting at hinge assemblies 50. Shock absorbing assemblies 40 limit how far side 36 of plate 32 can fall to prevent side 36 of plate 32 from hitting the floor 26 and cushion the impact on plate 32 and frame member 21B of shock absorbing assembly reaching its end of travel when guard assembly 30 has fully opened. When guard assembly 30 is opened, any debris on plate 32 slides or rolls onto the floor beside the machine. It is much easier and safer for people to collect debris along the side of a machine than from beneath it. Since people do not have to sweep debris from beneath a machine using a guard of the present invention, the machine is less likely to be damaged by such cleaning. Catch assembly 60 has remote release capability so an operator need not stand next to guard assembly 30 to release catch assembly 60. Therefore, an operator need not risk being injured by heavy or hazardous debris sliding down plate 32 when guard assembly 30 is opened. The remote release capability of catch assembly 60 also allows all guard assemblies 30 on a machine to be opened simultaneously from a single remote location. After debris is collected, each guard assembly 30 is closed by manually lifting side 36 of plate 32 until catch assembly 60 re-engages.

The preferred material for plate 32 is aluminum diamond tread because of its stiffness to weight ratio and relatively low cost. It has sufficient stiffness to span typical frame openings without unwanted deflection and it is light enough to be manually lifted to close guard assembly 30. Other materials having a high stiffness to weight ratio are also suitable for plate 32. Such materials include sandwich panels having a lightweight core material with composite or metal face sheets bonded to both sides of it, or beam-stiffened panels. While those materials may have better stiffness to weight ratios than aluminum diamond tread, they are also more susceptible to impact damage from debris dropping on them. The design and selection of plate 32 as well as shock absorbing assemblies 40, hinge assemblies 50, and catch assembly 60 accommodate the total weight of debris supported by the guard assembly 30.

Figure 4:
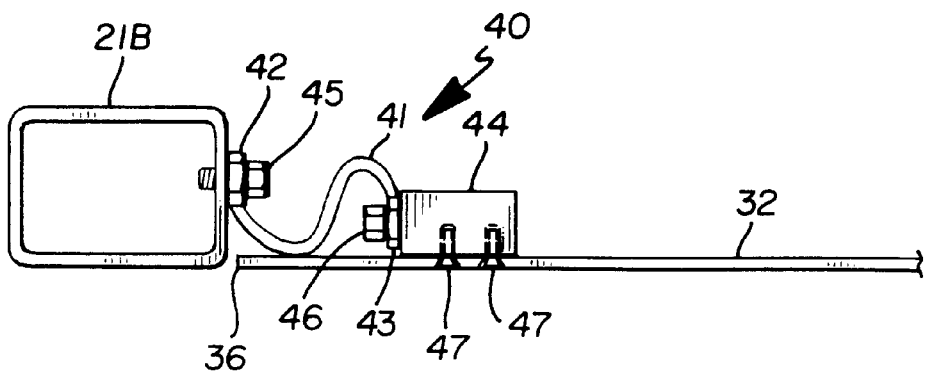
FIG. 4 is a section view taken along line 4—4 of FIG. 2 showing a shock absorbing device.

Referring to FIG. 4, in the preferred embodiment, shock absorbing assembly 40 comprises a shock cord 41 having a first end 42 attached to frame member 21B with bolt 45 and a second end 43 attached to block 44 with bolt 46. Block 44 is attached to plate 32 with threaded fasteners 47. Alternative fastening methods, such as welding, bonding, or riveting may be used to attach block 44 to plate 32. Shock cord 41 is preferably a flexible elastomeric cord, but shock cord 41 may alternatively be a chain or cable if the limited shock absorbing capabilities of those materials are acceptable. Shock cord 41 is long enough so that plate 32 is inclined sufficiently for debris on plate 32 to easily slide or rolls off when guard assembly 30 is open, but short enough that side 36 of plate 32 will not hit the floor when guard assembly 30 opens. As shown in FIGS. 2 and 3, two shock absorbing assemblies 40 may be used with a guard assembly 30. One is located on either side of catch assembly 60 at appropriate locations along side 36 of plate 32. However it is possible to use just one shock absorbing assembly 40. In such a use shock absorbing assembly should be centrally located along side 36 of plate 32 near catch assembly 60. Using two or more shock absorbing assemblies 40 provides redundancy in case one shock cord 41 or other component of shock absorber assembly 40 breaks. The shock load from guard assembly 30 opening is also spread among multiple locations on plate 32 and frame member 21B as well as multiple shock absorbing assemblies 40, thereby reducing the load at each location.

Figure 5:
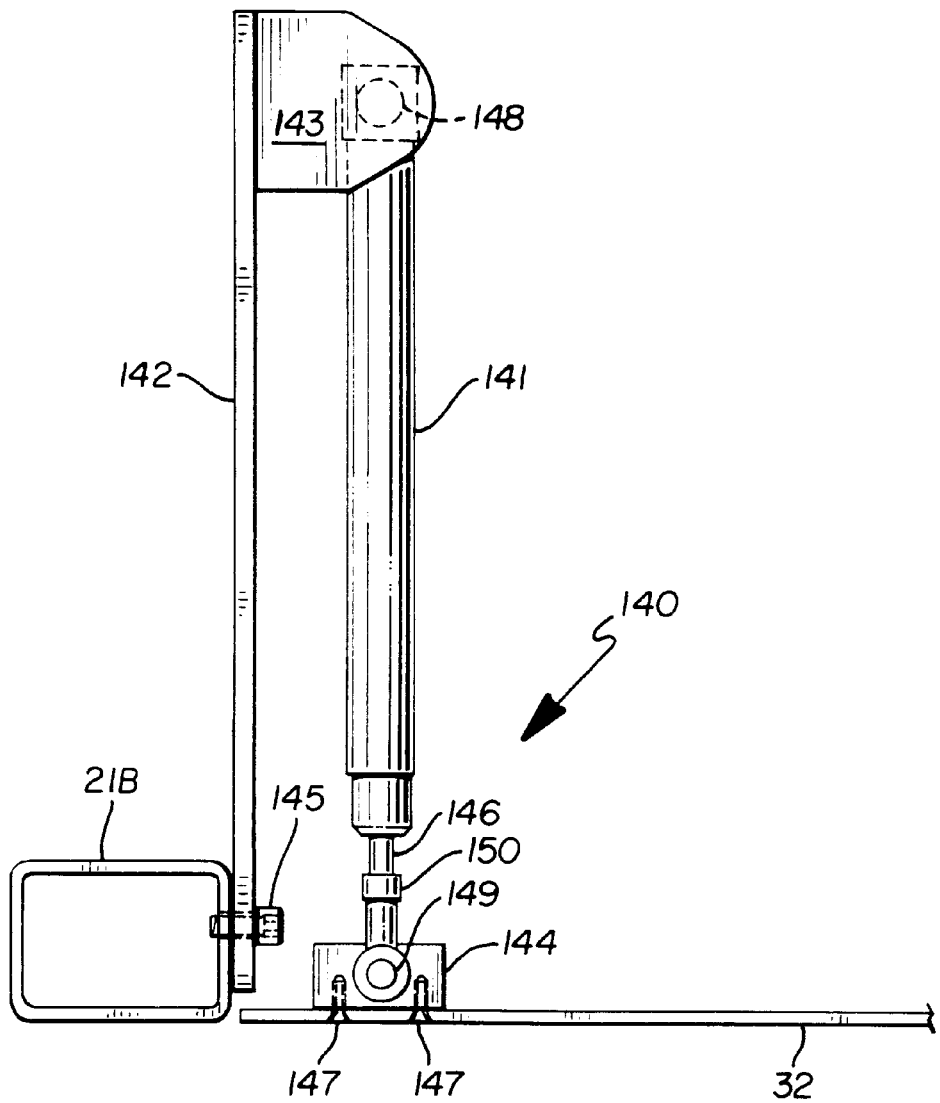
FIG. 5 shows an alternate shock absorbing device in a sectional view taken along 4—4 of FIG. 2.

Referring to FIG. 5, an alternative shock absorbing assembly 140 uses an pneumatic cylinder 141. Since pneumatic cylinder 141 must have substantial length to allow plate 32 to open sufficiently, pneumatic cylinder 141 cannot be attached directly to frame member 21B as was shock cord 41 of FIG. 4. Pneumatic cylinder 141 is preferably attached to a frame member (not shown) located above frame member 21B. If no suitable attachment structure above frame member 21 exists, a bracket such as 142 can be attached to frame member 21B by means such as bolt 145 or welding. Bracket 142 has a pair of flanges 143 spaced to receive pneumatic cylinder 141 between them. Pneumatic cylinder 141 pivotally attaches to flanges 143 at pivot point 148 which is sufficiently above plate 32 to accommodate the length of pneumatic cylinder 141. Rod end 150 is attached to shaft 146 of pneumatic cylinder 141 and pivotally secured to block 144 at pivot point 149. Block 144 is attached to plate 32 with threaded fasteners 147.

As plate 32 swings open, gas pressure in pneumatic cylinder 141 counteracts the weight of plate 32 and debris on it to cushion the drop of plate 32. Pneumatic cylinder 141 may be closed so that gas inside of it is compressed as plate 32 drops, thereby increasing resistance to and slowing the drop of plate 32 the further it drops. Alternatively, pneumatic cylinder may have an orifice through which controlled venting of gas is done as plate 32 drops to provide a steady, controlled drop of plate 32. The pressure in pneumatic cylinder 141 can be adjusted to provide optimum counter-action of plate 32 opening depending on the weight of plate 32 and debris on it.

It is also possible to use pneumatic cylinder 141 to lift plate 32 closed after debris is removed. However, such a powered pneumatic cylinder also creates risk of inadvertent closing which could pinching something or someone between plate 32 and frame member 21B as plate 32 is closed. Appropriate safeguards must be taken when using pneumatic cylinder to power plate 32 closed.

A hydraulic cylinder or damper may be used in place of pneumatic cylinder 141 in a similar manner as pneumatic cylinder 141. Hydraulic or pneumatic cylinders or dampers performing this function may be attached to plate 32 and other frame members at other locations closer to hinged side 34.

Figure 6:
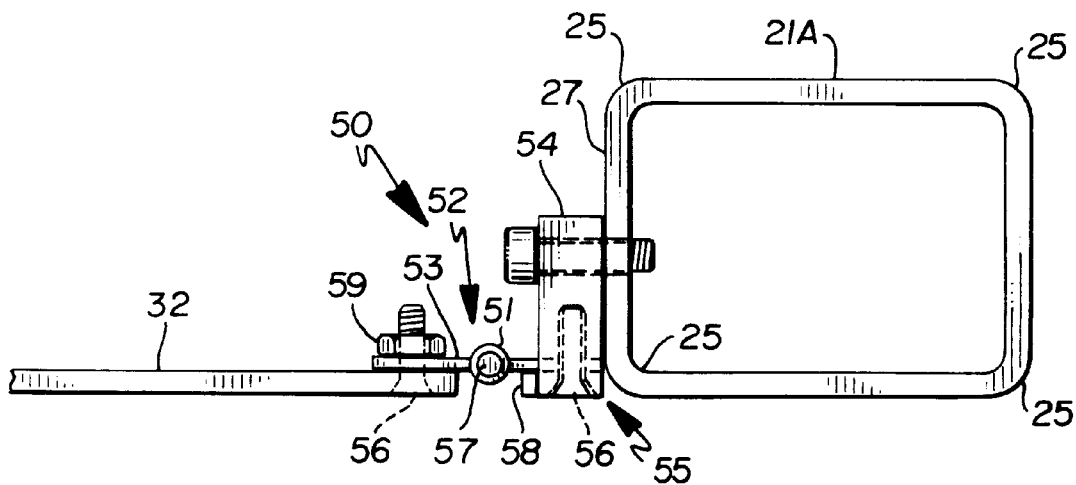
FIG. 6 is a section view taken along line 6—6 of FIG. 2 showing a hinge detail.

Referring to FIG. 6, hinge assembly 50 comprises a hinge 51 having a first half 52 and a second half 53 pivoting on hinge pin 57, a mounting block 54, and a cover plate 55. Rounded corners 25 on frame member 21A make it difficult to attach hinge 51 directly to the bottom of frame member 21A. Holes through which screws 56 are installed may fall on the corner rather than on a flat surface. To provide a flat mounting surface for the first half 52 of hinge 51, mounting block 54 is attached to frame member 21A by means such as bolting or welding. First half 52 of hinge 51 is sandwiched between the bottom of mounting block 54 and cover plate 55. Screws 56 secure cover plate 55 and first half 52 of hinge 51 to mounting block 54 along the length of first half 52. Without cover plate 55, the maximum bending load on first half 52 of hinge 51 due to the weight of plate 32 and accumulated debris would occur at the holes where screws 56 are installed. That area is the weakest due to the presence of the holes. Cover plate 55 covers nearly all flat area of first half 52 of hinge 51 and moves the area of maximum bending load in first half 52 to a stronger location at the end 58 of cover plate 55. Cover plate 55 thereby improves resistance to bending of first half 52 from the weight of plate 32 and debris on it.

Plate 32 is fastened to second half 53 of hinge 51 by screws 56 and nuts 59 along the length of second half 53.

Hinge assembly 50 my have two or more short sturdy hinges along the length of plate 32 as shown in FIGS. 2 and 3, or it may have one or more long hinges such as a piano hinge. To install or remove either type of hinge assembly, block 54 is first attached to vertical wall 27 of frame member 21A. Assembled hinge 51 is attached to plate 32 with screws 56 and nuts 59. From below frame member 21A, plate 32 with hinge 51 is positioned and screws 56 are installed through cover plate 55, first half 52 of hinge 51, and into block 54 to pivotably attach plate 32 to frame member 21A.

First half 52 of hinges 51 could be oriented vertically and attached directly to vertical wall 27 of frame member 21A if hinges 51 have readily removable hinge pins 57. For such an installation, first half 52 and second half 53 of hinges 51 are separated and separately attached to frame member 21A and plate 32 respectively. Plate 32 is positioned from below frame member 21A to align first half 52 and second half 53 of hinges 51, then the hinge pins 57 are reinstalled. Such a mounting places hinge mounting screws 56 on first half 52 above plate 32, inside the area which the closing of plate 32 is intended to make inaccessible. If hinge 51 is a piano hinge or other such type hinge where the hinge pin 57 is not intended to be removed, plate 32 with hinge 51 attached could not be readily installed or removed from below the machine with such a mounting. With plate 32 open, mounting screws 56 may be accessed, but personnel accessing them may have to be supported by the very plate 32 which they are trying to install or remove, which could be very difficult and unsafe.

Figure 7:
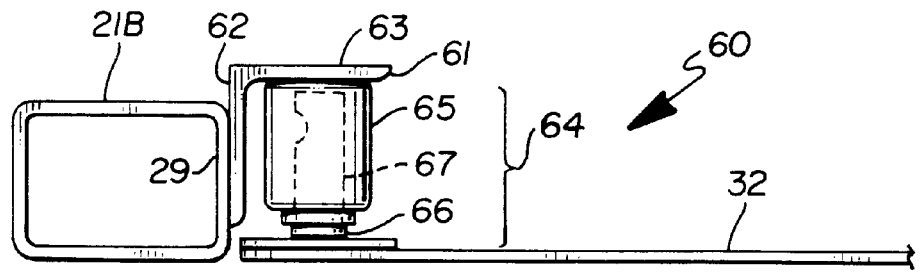
FIG. 7 is a section view taken along line 7—7 of FIG. 2 showing a catch device.

Referring to FIG. 7, in the preferred embodiment catch assembly 60 comprises a mounting bracket 61 and a latching device 64 having solenoid actuated release. Mounting bracket 61 has a vertical portion 62 attached to vertical wall 29 of frame member 21B by means such as bolting or welding and a horizontal portion 63. Latching device 64 is preferably a safety interlock limit switch such as Telemecanique Model XCKJ5951BO-547 supplied by Telemecanique, of Owings Mills, Md. Latching device 64 has a receiving unit 65 securely attached to horizontal portion 63 of bracket 61 and a key 66 securely attached to plate 32. Receiving unit 65 has a latching mechanism, a solenoid-actuated release mechanism, a solenoid, electrical connections for the solenoid, and a receptacle for key 66. Key 66 has an upper portion 67 which is received by and interlocks with receiving unit 65, and a base portion 68 which provides for secure attachment of key 66 to plate 32 by means such as bolting or welding.

Figure 8:
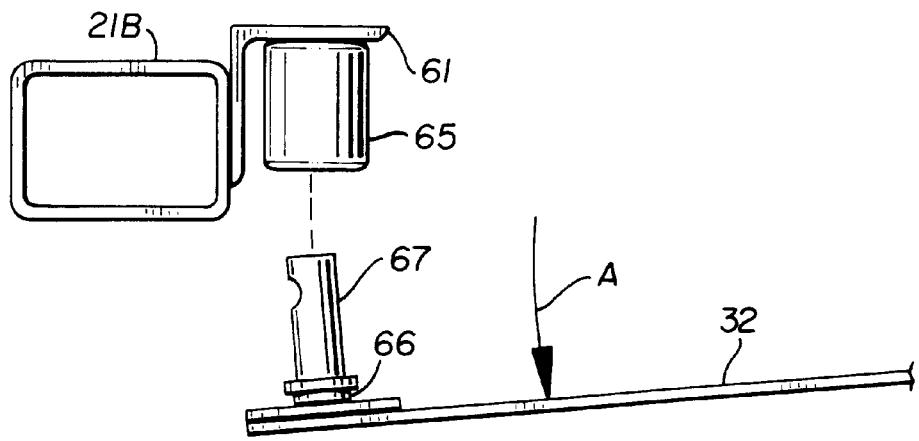
FIG. 8 shows a catch device as the guard door opens in a section view taken along line 7—7 of FIG. 2.

Referring to FIGS. 7 and 8, receiving unit 65 and key 66 are positioned on horizontal portion 63 and plate 32 respectively so that key 66 will readily engage and release from receiving unit 65 as plate 32 swings. The height of bracket 61 with respect to frame member 21B is positioned the so that plate 32 will be at the desired vertical position with respect to frame member 21B when key 66 is engaged in receiving unit 65 as shown in FIG. 7.

When plate 32 is lifted such that key 66 is inserted in to receiving unit 65, a latching mechanism inside receiving unit 65 engages upper portion 67 of key 66 to hold key 66 securely in receiving unit 65 thereby releasably attaching plate 32 to frame member 21B. When a solenoid of receiving unit 65 is actuated by a remote signal, receiving unit 65 releases upper portion 67 of key 66 and plate 32 pivots downward as indicated by arrow A.

Latching device 64 can be electrically connected to a controller of a machine on which a guard of the present invention is used to provide a safety interlock which prevents the machine from operating when the guard is open. Receiving units 65 on several guards installed on one machine can all be connected to release their keys 66 simultaneously upon a remote signal so that all guards of the present invention on a machine open at the same time.

Guards of the present invention installed on the bottom of a machine provide for safer and easier removal of debris from operation of the machine because the debris is dumped to the side of the machine onto the floor or into a receptacle when the guards open. Guards of the present invention also provide the safety feature of preventing access to working machinery from below the machine while the machine is operating. The same guards can be used on a machine regardless of the height of the machine above the floor. Guards of the present invention eliminate the need for safety skirting around the base of a machine, and therefore eliminate the cost of changing skirt height due to changes in machine height above the floor.

The descriptions above and the accompanying drawings should be interpreted in the illustrative and not the limited sense. While the invention has been disclosed in connection with the preferred embodiment or embodiments thereof, it should be understood that there may be other embodiments which fall within the scope of the invention as defined by the following claims. Where a claim is expressed as a means or step for performing a specified function it is intended that such claim be construed to cover the corresponding structure, material, or acts described in the specification and equivalents thereof, including both structural equivalents and equivalent structures.

What is claimed is:

1. A guard for a machine, comprising:
   (a) a plate oriented adjacent said machine, said plate having a first side adapted for hinged connection to a first location on the machine, and a second side adapted for releasable connection to a second location on the machine;
   (b) at least one hinge having a first portion connected to the first machine location, a second portion attached to said plate near said first side and a pivoting center between said first portion and said second portion, said at least one hinge having a plurality of mounting holes in said first portion and said second portion, said second portion being attached to said plate by mechanical fasteners;
   (c) a hinge mounting block connected to each of said at least one hinges, said at least one hinge mounting block having a bottom side, said at least one hinge mounting block being attached to the first machine location, said first portion of said hinge being attached to said bottom side of said mounting block;
   (d) a cover plate mounted below said first portion of said hinge, said first portion of said hinge being sandwiched between said bottom side of said mounting block and said cover plate, said cover plate extending beyond said mounting holes in said first portion of said hinge toward said pivoting center of said hinge, said cover plate and said first portion of said hinge being attached to said bottom side of said mounting block by mechanical fasteners which extend through said cover plate and said mounting holes in said first portion of said hinge and which engage said mounting block;
   (e) means for selectively holding and releasing said second side of said plate; and
   (f) means for limiting travel of said second side of said plate when said second side is released by said means for releasing.

2. The guard of claim 1, wherein said travel is caused by gravity.

3. The guard of claim 1, wherein said at least one hinge is a plurality of flat hinges.

4. The guard of claim 1, wherein said plate is constructed of aluminum diamond tread.

5. The guard of claim 1, wherein said means for selectively holding and releasing said second side of said plate is a latching device having a first portion connected to said second location and a second portion attached to said plate near said second side, said first portion and said second portion of said latching device selectively interlocking with each other and releasing.

6. The guard of claim 5, wherein said latching device has a mechanical latching mechanism which causes said interlocking of said first portion and said second portion.

7. The guard of claim 5, wherein said latching device has a remotely actuated release mechanism.

8. The guard of claim 7, further comprising a solenoid and wherein said solenoid actuates said release mechanism upon a signal from a remote location.

9. The guard of claim 1, wherein said means for limiting travel of said second side of said plate absorbs shock.

10. The guard of claim 9, wherein said means for limiting travel of said second side of said plate is at least one shock cord connected between said second location and said second side of said plate.

11. The guard of claim 10, wherein said shock cord is elastomeric.

12. The guard of claim 9, wherein said means for limiting travel of said second side of said plate is at least one pneumatic cylinder connected to said plate.

13. The guard of claim 12, wherein said at least one pneumatic cylinder is used to lift said second side of said plate to engage said means for selectively holding and releasing said second side of said plate.

14. The guard of claim 9, wherein said means for limiting travel of said second side of said plate is at least one hydraulic cylinder connected to said plate.

15. The guard of claim 14, wherein said at least one hydraulic cylinder is used to lift said second side of said plate to engage said means for selectively holding and releasing said second side of said plate.

16. A debris containment guard for a bottom region of a machine having a first frame member and a second frame member, and for holding debris from operation of the machine which falls onto said guard, and for discharging the debris to a side of the machine by opening said guard, comprising:

(a) a plate adapted for orientation adjacent the first frame member and the second frame member, said plate having a first side adjacent the first frame member and a second side, said plate supporting debris;

(b) at least one hinge mounting block, said hinge mounting block having a bottom side, said hinge mounting block being attached to the first frame member so that said bottom side is generally parallel to said plate and adjacent said first side of said plate;

(c) at least one hinge having a first portion connected to said bottom side of said at least one hinge mounting block, a second portion attached to said plate near said first side, and a pivoting center between said first portion and said second portion, said first portion and said second portion having a plurality of mounting holes for receiving mechanical fasteners;

(d) a cover plate mounted below said first portion of said hinge, said first portion of said hinge being sandwiched between said bottom side of said mounting block and said cover plate, said cover plate extending beyond said mounting holes in said first portion of said hinge toward said center of said hinge, said cover plate and said first portion of said hinge being attached to said bottom side of said mounting block by mechanical fasteners which extend through said cover plate and said mounting holes in said first portion of said hinge and which engage said mounting block;

(e) at least one shock cord connected between the second frame member and said second side of said plate; and (f) a latching device having a first portion connected to the second frame member and a second portion attached to said plate near said second side, said first portion having a mechanical latching mechanism which captures said second portion of said latching device, thereby retaining said second side of said plate, said first portion having a release mechanism and a solenoid which activates said release mechanism upon a signal from a remote location thereby releasing said second portion from said first portion which allows said second side of said plate to move by gravity and debris to be discharged.

17. A machine in combination with a debris containment guard system for holding debris from operation of said machine which falls onto said guard system, and for discharging debris to a side of said machine by opening said guard system, comprising:

(a) a machine frame having at least two generally spaced parallel members, and a plurality of transverse members, any two adjacent said spaced parallel members and any two adjacent said transverse members forming an opening, one of said spaced parallel frame members forming said opening being a first frame member, and a second said spaced parallel frame member forming said opening being a second frame member; and (b) a guard generally closing said opening, said guard having:

(i) a plate oriented adjacent said frame, said plate having a first side adjacent said first frame member and a second side, said plate supporting said debris;

(ii) at least one hinge mounting block, said hinge mounting block having a bottom side, said hinge mounting block being attached to said first frame member so that said bottom side is generally parallel to said plate and adjacent said first side of said plate;

(iii) at least one hinge having a first portion connected to said bottom side of said at least one hinge mounting block, a second portion attached to said plate near said first side, and a pivoting center between said first portion and said second portion, said first portion and said second portion having a plurality of mounting holes for receiving mechanical fasteners;

(iv) a cover plate mounted below said first portion of said hinge, said first portion of said hinge being sandwiched between said bottom side of said mounting block and said cover plate, said cover plate extending beyond said mounting holes in said first portion of said hinge toward said center of said hinge, said cover plate and said first portion of said hinge being attached to said bottom side of said mounting block by mechanical fasteners which extend through said cover plate and said mounting holes in said first portion of said hinge and which engage said mounting block;

(v) at least one shock cord connected between said second frame member and said second side of said plate; and (vi) a latching device having a first portion connected to said frame and a second portion attached to said plate near said second side, said first portion having a mechanical latching mechanism which captures said second portion of said latching device, thereby retaining said second side of said plate, said first portion having a release mechanism and a solenoid which activates said release mechanism upon a signal from a remote location thereby releasing said second portion from said first portion which allows said second side of said plate to move by gravity and said debris to be discharged.

* * * * *